(12) United States Patent
Fletcher

(10) Patent No.: US 6,567,836 B1
(45) Date of Patent: May 20, 2003

(54) MULTI-LEVEL CARRY-SKIP ADDER

(75) Inventor: Thomas D. Fletcher, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/469,426

(22) Filed: Dec. 23, 1999

(51) Int. Cl.[7] .................................................. G06F 7/50
(52) U.S. Cl. ........................ 708/710; 708/702; 708/704
(58) Field of Search .................................. 708/700–714

(56) References Cited

U.S. PATENT DOCUMENTS

| | | | | |
|---|---|---|---|---|
| 3,451,458 A | | 6/1969 | Stueber ........................ | 152/330 |
| 3,664,403 A | | 5/1972 | Doran et al. ................. | 152/330 |
| 3,728,532 A | * | 4/1973 | Pryor .......................... | 708/711 |
| 3,768,537 A | | 10/1973 | Hess et al. ................... | 152/330 |
| 3,884,285 A | | 5/1975 | Russell et al. ............... | 152/330 |
| 3,938,574 A | | 2/1976 | Burmester et al. ........... | 152/330 |
| 4,100,172 A | | 7/1978 | Mui et al. .................... | 260/327 |
| 4,128,438 A | | 12/1978 | Wolff et al. .................. | 106/307 |
| 4,482,663 A | | 11/1984 | Kraus .......................... | 524/99 |
| 4,519,430 A | | 5/1985 | Ahmad ........................ | 152/209 |
| 4,584,661 A | * | 4/1986 | Grundland ................... | 708/712 |
| 4,590,052 A | | 5/1986 | Chevallier et al. ........... | 423/335 |
| 4,704,414 A | | 11/1987 | Kerner et al. ................ | 523/213 |
| 5,066,721 A | | 11/1991 | Hamada et al. .............. | 525/102 |
| 5,089,554 A | | 2/1992 | Bomo et al. ................. | 524/493 |
| 5,110,969 A | | 5/1992 | Dittrich et al. .............. | 556/327 |
| 5,159,009 A | | 10/1992 | Wolff et al. .................. | 524/495 |
| 5,227,425 A | | 7/1993 | Rauline ....................... | 514/493 |
| 5,278,783 A | * | 1/1994 | Edmondson ................. | 708/711 |
| 5,753,732 A | | 5/1998 | Wideman et al. ............ | 524/263 |

FOREIGN PATENT DOCUMENTS

GB          1424503          2/1976

OTHER PUBLICATIONS

Silvio Turrini et al., A Fully–Statis Low Power, High Performance 64–bit 3–level carry skip adder, 1994, IEEE Symposium on Low Power Electronics, p. 68–69.*
Chetana Nagendra et al., Area–Time–Power Tradeoffs in Parallel Adders, Oct. 1996, IEEE Transactions on Circuits and Systems–II: Analog and Digital Signal Processing vol. 43, No. 10, p. 689–702.*
Min Cha et al., Modified Carry Skip Adder for Reducing First Block Delay, Aug. 2000, IEEE Symposium on Circuits and Systems, p. 346–348.*
Pak K. Chan et al., Delay Optimization of Carry–Skip Adders and Block Carry–Lookahead Adders Using Multidimentional Dynamic Programming, Aug. 1992, IEEE Transactions on Computers, vol. 41, No. 8, p. 920–930.*
Vitit Kantabutra, Designing Optimum One–Level Carry–Skip Adders, Jun. 1993, IEEE Transactions on Computer, vol. 42, No. 6, p. 759–764.*
Goel et al., A New Time–Position Algorithm for the Modeling of Multilevel Carry Skip Adders in VHDL, 1996, IEEE, p. 158–161.*
Pak K. Chan et al., Delay Optimization of Carry–Skip Adders and Block Carry–Lookahead Adders, 1991, IEEE, p. 154–164.*
Akhilesh Tyagi, A Reduced Area Scheme for Carry–Select Adders, 1990, IEEE, p. 255–258.*

(List continued on next page.)

*Primary Examiner*—Chuong Dinh Ngo
*Assistant Examiner*—Chat C. Do
(74) *Attorney, Agent, or Firm*—Fish & Richardson P.C.

(57) ABSTRACT

Circuits for binary adders to efficiently skip a carry bit over two or more bit positions with two or more carry-skip paths. In one implementation, such a binary adder includes a network of carry-processing cells for producing kill, generate, and propagate signals and carry-skip cells for bypassing certain bit positions with dual-wire differential signal paths to provide high-speed processing of adding operations.

15 Claims, 4 Drawing Sheets

OTHER PUBLICATIONS

Silvio Turrini, "Optimal Group Distribution in Carry–Skip Adders", Feb. 1989, Western Research Laboratory (WRL) Research Report 89/2, Copyright ©1989 Digital Equipment Corporation.

Bartlett, P.D. and Ghosh, T., Journal of Organic Chemistry, 1987, 52, 4937.

Garrett, A.B. and Hirschler, Alfred E., Journal of American Chemical Society, 1938, vol. 60 304.

Shields, T.C. and Kurtz, A.N., Journal of the American Chemical Society, 1969, 91, 5415.

* cited by examiner

MULTI-LEVEL CARRY-SKIP ADDER

BACKGROUND

This disclosure is related to digital circuits for data processing, and more specifically, to digital adders.

A digital adder circuit digitally adds two digital numbers. Adding is a basic data manipulation in digital processing. Many electronic data processing devices, including microprocessors, implement one or more digital adders.

Binary adders are widely used in various digital electronic devices. Adding two binary numbers includes adding bits at each bit position of two input binary numbers using an exclusive or ("XOR") operation, and also adding the corresponding carry-in bit from an adjacent lesser significant bit position, to produce a sum bit for that bit-position. A carry-out bit produced by that sum is determined and is then sent to the next, more significant bit position.

The carry-out bit from each bit position is zero, i.e., a "kill", when two inputs to be added are both zero, no matter what the carry-in bit is. When two inputs to the bit position are both one, the carry-out bit is always one, i.e., a "generate". The value of the carry-in bit does not affect the carry-out bit. However, when the two inputs are different, the carry-out bit is the carry-in bit to that bit position, i.e., the bit position "propagates" its carry-in bit to the next bit position. Binary adders use a special logic, a "PGK cell", to process the carry at each bit position. Each PGK cell includes logic elements such as transistors to perform the above carry processing based on whether the addition operation at the bit position produces a propagate ("P"), a generate ("G"), or a kill ("K").

This carry computation by each PGK cell takes time and need be carried out at each bit position. Hence, the carry computation can significantly affect the overall processing speed of a binary adder, especially, when the bit number is large, such as in a 32-bit adder. It is therefore desirable to develop binary adders that can efficiently process the carry information at a high speed.

SUMMARY

The present devices and techniques include mechanisms that allow propagation of a carry bit by skipping or bypassing two or more selected bit positions in binary adders, whenever permissible, though two or more levels of carry-skip paths in the carry processing part of the adders.

One embodiment of such adders includes carry-processing cells connected in series, carry-skip cells each coupled across a group of carry-processing cells, and a plurality of logic gates to control the carry-skip cells.

Each carry-processing cells processes carry information to generate a carry signal. Each carry-skip cell is coupled across a respective group of carry-processing cells to send a carry directly to a carry-processing cell that is subsequent to a most significant bit position in the respective group, when each and every carry-processing cell in the respective group produces a propagate.

Each logic gate is coupled between a carry-skip cell and a respective group of carry-processing cells to receive all carry signals from the respective group to produce an output. The number of carry-processing cells in all groups of carry-processing cells associated with the carry-skip cells is less than a maximum number. This number has a relationship with a total number of the carry-processing cells in the adder.

BRIEF DESCRIPTION OF THE DRAWINGS

These and other aspects and their associated advantages will now be described in detail with respect to the accompanying drawings, wherein.

DETAILED DESCRIPTION

Binary adders described in this disclosure include multiple processing stages that perform adding and carry processing at different bit positions. Each processing stage includes an input logic cell that performs the adding and a PGK cell that processes the carry information at that bit position. Two or more levels of carry-skip paths are provided to skip groups of two or more bit positions, to reduce the delay in carry processing. Each carry-skip level includes at least one carry-skip path which has one carry-skip cell operable to switch on or off the carry-skip path, depending whether a skip is needed for the group of bit positions. A carry-skip cell is essentially an AND gate with inputs from the group of PGK cells, across which the respective carry-skip path is connected. When each PGK cell in a group produces a propagate, the carry-skip cell creates a group propagate by turning on the carry-skip path to skip the group. Since only the group propagate is needed, both group kill and group generate are eliminated. This reduces the number of transistors, and hence reduces the overall size of the adder.

Each carry-skip path in the first level is connected directly across at least two PGK cells of sequential bit positions. A carry-skip path in the second level is connected to skip at least one first-level path and at least another adjacent PGK cell. A carry-skip path in the third level is connected to skip at least one second-level path and at least another adjacent PGK cell, and so on.

Figure 1:
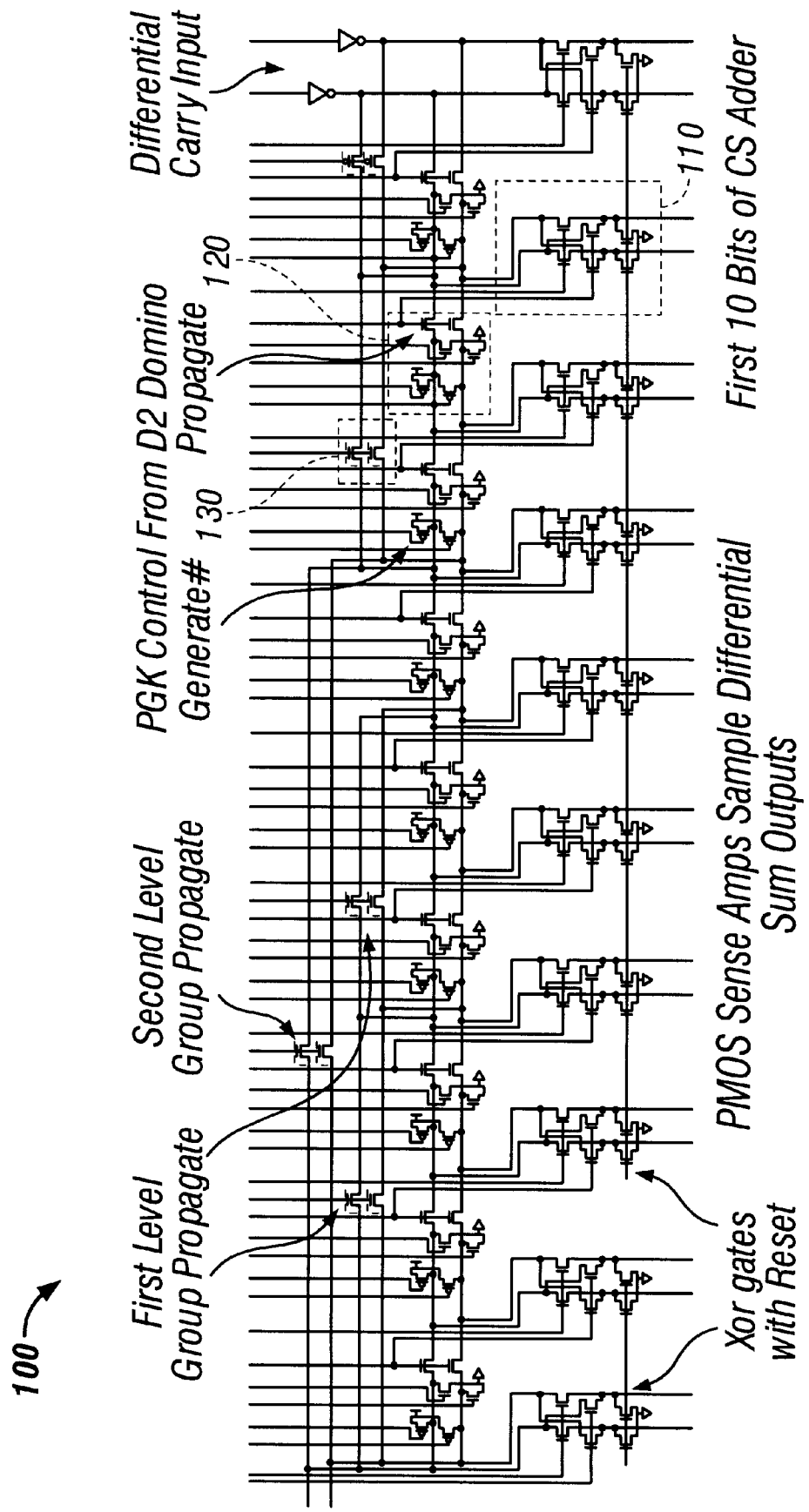
FIG. 1 shows the 10 least significant bit positions of an embodiment of a CMOS 32-bit binary carry-skip adder based on differential low voltage swing circuitry.

FIG. 1 shows one embodiment of a 32-bit binary carry-skip adder 100. Only the circuit elements for the 10 least significant bit positions are shown, to illustrate the construction of the XOR output part 110 of the input logic, the PGK cell 120, and the carry-skip cell 130 of each processing stage. The adder 100 is a CMOS device having transistors of two different conductivity types: NMOS and PMOS transistors. Differential low voltage swing circuitry is implemented in the adder 100 to represent each signal by the potential difference between two signal wires. This CMOS differential low voltage swing design allows the adder 100, and in particular, the PGK cell 120, to be compact and to operate at a high speed with high accuracy.

Figure 2:
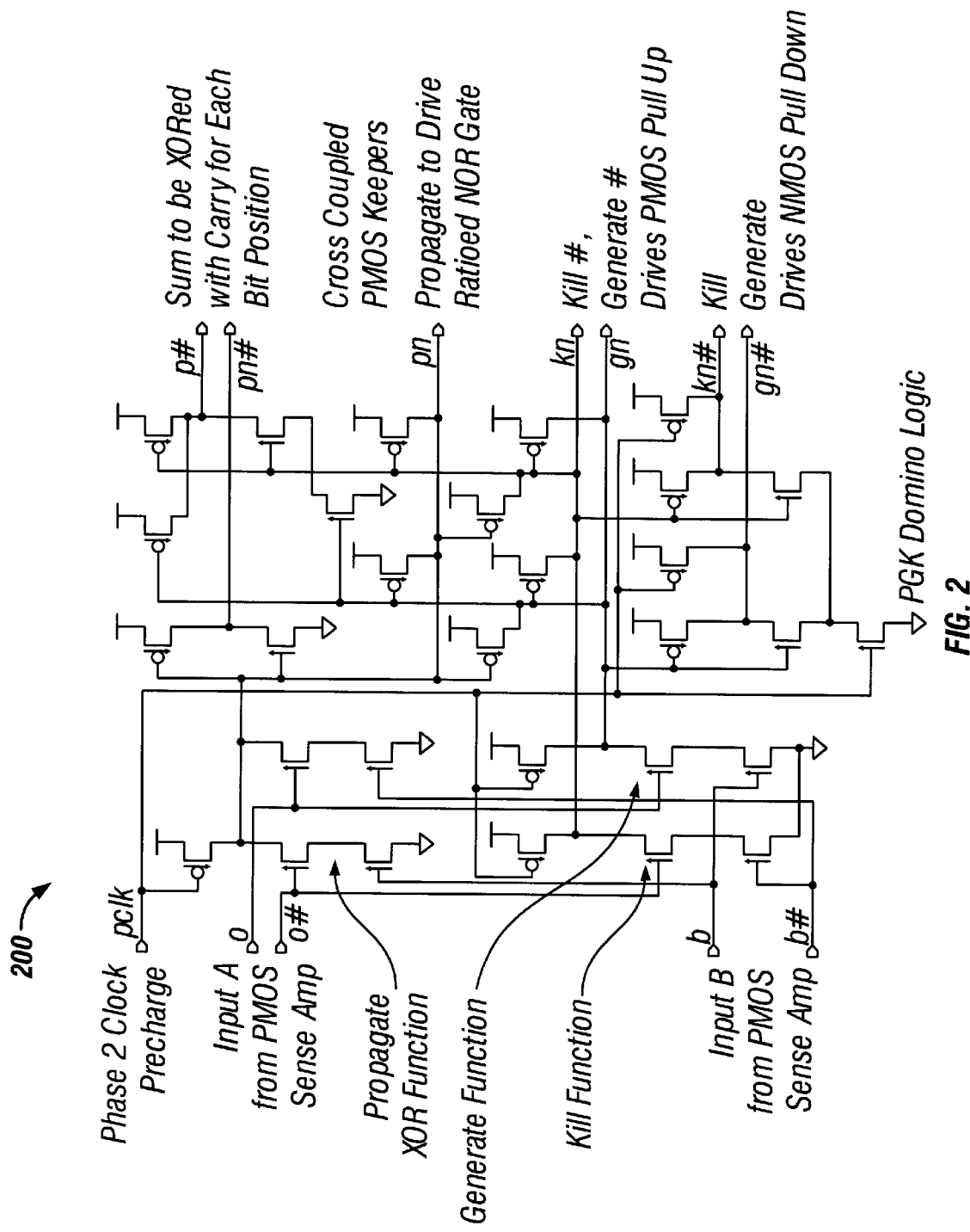
FIG. 2 shows one embodiment of the control logic in the input logic of each bit position in the adder of FIG. 1.

The XOR output part 110 of the input logic is formed of 6 NMOS transistors. A PGK control logic is also included in the input logic. FIG. 2 shows one embodiment of the PGK control logic 200 which is not shown in FIG. 1. The PGK control logic 200 is a differential Domino logic and processes input signals for a bit position from two different binary numbers A and B to produce the proper control signals for the PGK cell and the binary sum for that bit position. The XOR output part 110 adds the binary sum and the carry-in bit for that bit position by an XOR operation to produce the final sum for that bit position.

The properties of the PGK cell 110 can impact the overall properties of the adder 100. Hence, the PGK cell 110 should be carefully designed to use as few transistors as possible and to reduce various delay effects to achieve a high operating speed.

Figure 3:
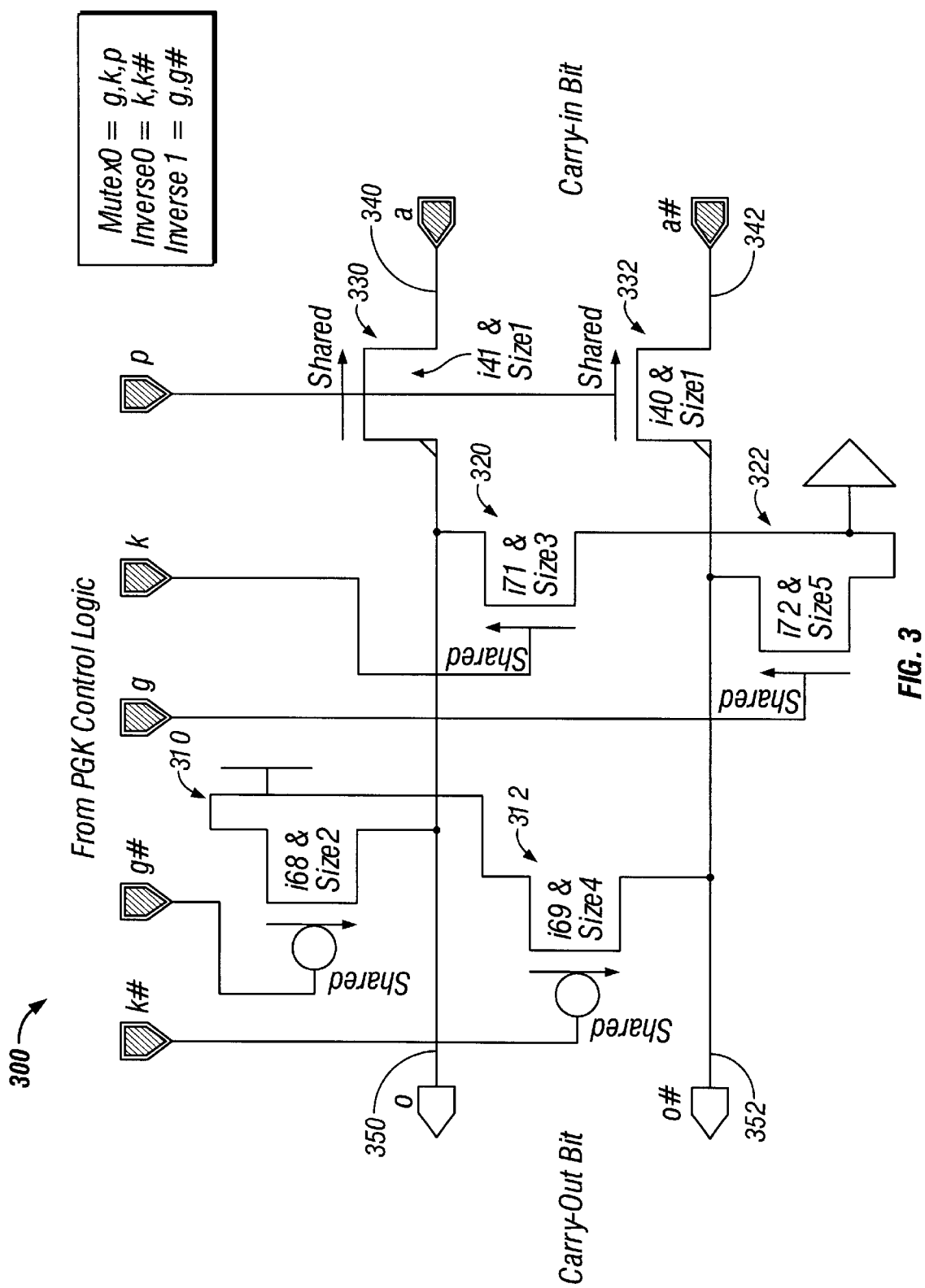
FIG. 3 shows one embodiment of the PGK cell used in the adder of FIG. 1.

FIG. 3 shows one embodiment 300 of the PGK cell having two PMOS transistors 310 and 312, 4 NMOS transistors 320, 322, 330, and 332. Two input wires 340 and 342 are used to represent a carry-in bit by their differential potential and two output wires 350 and 352 represent the respective carry-out bit. The 6 transistors form parallel controls to control the wires 340 and 342. The drain and source terminals of the NMOS transistors 330 and 332 are connected in the wires 340 and 342, respectively, to operate as switches. The gates of both transistors 330 and 332 are controlled by the propagate signal generated by the PGK control logic to switch on the wires 340 and 342 when a propagate is generated, or turn off the wires 340 and 342 when a propagate is absent.

The NMOS transistors 320 and 322 are respectively connected to the output wires 350 and 352 by their drains to pull down their potentials when so commanded by the signals kill and generate from the PGK control logic. The PMOS transistors 310 and 312, on the other hand, are connected to pull up the potentials of the output wires 350 and 352, respectively, in response to the complement signals of kill and generate. Hence, the states of the output wires 350 and 352 change, by pulling one wire up by a PMOS transistor, and at the same time, pulling the other down by a NMOS transistor. This generates or kills the carry at each bit position.

The above PGK cell design 300 has a number of advantages. For example, the PMOS transistors 310 and 312 are driven by the complementary signals of the kill and generate, respectively. Thus, they are turned on before the kill signal or the generate signal is on. Therefore, the PMOS transistors 310 and 312 do not drive the load of the relatively long carry-skip path. In stead, they drive the load of local diffusion drains at each bit position. Thus, the required driving power is low and hence the PMOS transistors 310 and 312 can be made small. This reduces the size of the PGK cell and increases the response speed.

The potential difference of the two wires 340 and 342 is changed by raising the potential of one wire while simultaneously reducing the potential of the other in response to two complementary control signals (i.e., generate or kill). Hence, the potential change on each wire can be only one half of the differential value. The charge-up time is only one half of the time needed when such a pulling-down mechanism is not implemented and one wire charges up to the full differential value relative to the other wire.

In addition, both NMOS transistors 320 and 322 are connected to respectively pull down the potentials of the wires 340 and 342 to a level near ground. This facilitates the stability and accuracy of the detection by a sensing amplifier formed of PMOS transistors.

The PGK cell 300 also reduces the number of transistors by eliminating the requirement for a reset transistor for each wire. This reduces the circuit capacitance and hence increases the processing speed. Moreover, the clocking mechanism is removed from the PGK cell 300 to further reduce the number of transistors. The clocking in the PGK cell 300 is indirectly implemented by the control signals produced from the PGK control logic shown in FIG. 2.

Figure 4:
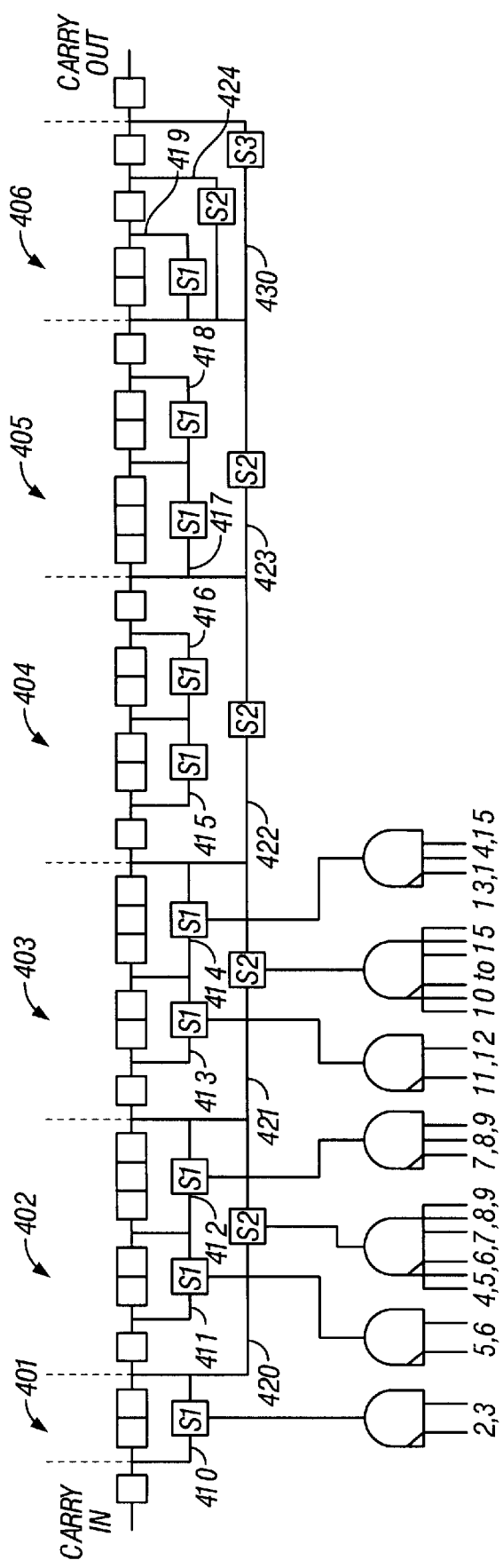
FIG. 4 shows the architecture of the carry-skip part of the 32-bit adder shown in FIG. 1.

FIG. 4 is a block diagram of the carry-skip circuitry used in the 32-bit binary adder 100 in FIG. 1. Three different levels of carry-skip paths are implemented. The first-level carry-skip paths are indicated by "S1". The second-level paths are indicated by "S2". The third level is indicated by "S3". The carry-skip dell in each carry-skip path is connected to the group of PGK cells which are skipped over by using an AND gate to generate a group propagate according to the status of the PGK cells. The AND gates for the 15 least significant bit positions are shown. The size of an AND gate increases with the number of PGK cells in a skip group.

It is discovered that, for a given number of bit positions in such a binary adder, when the maximum number of PGK cells in a group exceeds a limit, it can adversely affect the processing speed of the adder. This limit has a relationship with respect to the total number of bit positions in the adder and also varies with the total number of bit positions. For the 32-bit adder shown in FIGS. 1 and 4, this limit is 6. Hence, all carry-skip paths in FIG. 4 skip no more than 6 PGK cells.

The 32 bit positions are divided into 6 different skip regions 401 through 406. The first region 401 includes one first-level carry-skip path 410 to skip PGK cells at the second and third bit positions. The second region 402 includes PGK cells from the fourth bit position through the ninth bit position, with three different carry-skip paths 411, 412, and 420. The first-level carry-skip paths 411 and 412 skip the fifth and sixth bit positions, and the seventh through the ninth bit positions, respectively. The second-level carry skip path 420 skip all 6 bit positions in the region 402. The third region 403 includes a second-level carry-skip path over the tenth through fifteenth bit positions, a first-level carry-skip path over the eleventh and twelfth bit positions, and another first-level carry-skip path over the thirteenth through fifteenth bit positions.

The fourth region 404 is symmetric. It has a second-level path over all 6 bit positions from the sixteenth through the twenty-first bit positions, a first-level path over the seventeenth and eighteenth bit positions, and a symmetric first-level path over the nineteenth and the twentieth bit positions. The fifth region 405 is an inverse image of the region 403 with respect to the region 404. The sixth region 406 is the only region that includes carry-skip paths 419, 424, and 430 of three different levels. The first-level path 419 skips the twenty-eighth and twenty-ninth bit positions. The second-level path 424 skips the twenty-eighth through thirtieth bit positions. The third-level path 430 skips all four bit positions in the region 406.

The above configuration of the carry-skip paths ensures that, any generate from any bit position in the adder transmits through no more than 8 passgates, accounting for PGK cells, the carry-skip cells, and the final XOR gates that produce the sum at each bit position, to reach the carry-out terminal. Hence, the worst-case delay in the processing the carry is no worse than 8 low-voltage swing passgate delays.

Even though the implementation of the above carry-skip paths significantly reduces the delay, the amount of delay in producing the carry at each bit position still increases as a function of the bit position from the least significant bit position to the most significant bit position. Ideally, the carry signals to all bit positions should arrive at the same time. In practical devices, this ideal condition is extremely difficult to meet. However, the circuit can be constructed to approach the ideal condition within an acceptable range.

One way to mitigate this delay is to adjust the channel widths of the transistors (e.g., the NMOS transistors in the PGK cells 120 and carry-skip cells 130) in a relationship with respect to the bit positions so that the transistor delay reduces as the bit position increases from the least significant bit to the most significant bit. Hence, the channel widths of the transistors decrease as the bit position increases. For example, the channel width for a transistor at the least significant bit position may be about 20 $\mu$m and the channel width of a transistor at the most significant bit position may be 1 $\mu$m.

Although only a few embodiments are disclosed, other modifications and variations are possible without departing from the scope of the following claims.

What is claimed is:

1. A binary adder circuit, comprising:
    a plurality of carry-processing cells connected in series, each operable to generate a carry signal, wherein each carry-processing cell comprises:
        first and second wires whose difference in potential represents a carry bit signal;
        a pair of switch transistors respectively coupled to said first and second wires to turn on or off said first and second wires in response to a propagate signal;
        a first pull-down transistor of a first conductivity type coupled to said first wire to reduce a potential of said first wire in response to a kill signal;
        a second pull-down transistor of said first conductivity type coupled to said second wire to reduce a potential of said second wire in response to a generate signal;
        a first pull-up transistor of a second conductivity type opposite to said first conductivity type, coupled to said first wire to increase a potential of said first wire in response to a signal complementary to said generate signal; and
        a second pull-up transistor of said second conductivity type coupled to said second wire to raise a potential of said second wire in response to a signal complementary to said kill signal;
    a plurality of carry-skip cells, each coupled across a group of carry-processing cells to send a carry directly to a carry-processing cell subsequent to a most significant bit position in said group, when each carry-processing cell in said respective group produces a propagate; and
    a plurality of logic gates, each coupled between a carry-skip cell and a respective group of carry-processing cells to receive all carry signals from said respective group to produce an output which controls said carry-skip cell.

2. An adder as in claim 1, wherein said carry-processing cells, said carry-skip cells, and said logic gates include CMOS circuits.

3. An adder as in claim 2, wherein channel widths of transistors in each of said carry-processing cells, said carry-skip cells, and said logic gates decrease as the bit position changes from the least significant bit position to the most significant bit position.

4. An adder as in claim 2, wherein each of said carry-processing cells, said carry-skip cells, and said logic gates includes two wires to represent a signal by a difference between potentials of said two wires.

5. An adder as in claim 1, wherein said first and second pull-up transistors are PMOS transistors, said first and second pull-down transistors and said pair of switch transistors are NMOS transistors.

6. An adder as in claim 1, wherein each of said first and second pull-down transistors is coupled to bring a respective potential of either of said first and second wires at or near ground.

7. An adder as in claim 1, wherein channel widths of transistors in each carry-processing cell, each carry-skip cell, and each logic gate decrease as the bit position changes from the least significant bit position to the most significant bit position.

8. The circuit as in claim 1, further comprising a PGK control logic circuit having inputs to receive a first input and a second input that are to be added, a propagate XOR function circuit element, a generate function circuit element, a kill function circuit element, and a output circuit to produce said kill signal and its complementary signal, said generate signal and its complementary signal, and said propagate signal for controlling a respective carry-processing cell.

9. A method for processing carry information in a binary adder, comprising:
    connecting a plurality of carry-processing cells in series, each processing carry information to generate a carry signal indicating a kill, a generate, or a propagate for a respective bit position;
    coupling a plurality of carry-skip cells to eliminate passing a carry bit through selected groups of carry-processing cells, each carry-skip cell coupled across a respective group of carry-processing cells to send a carry bit directly to a carry-skip cell that is subsequent to a most significant bit position in said respective group, when each and every carry-processing cell in said respective group produces a propagate;
    selecting one set of said plurality of carry-skip cells to each eliminate passing a carry bit through a group of carry-processing cells that are bypassed by another carry-skip cell and at least another carry-processing cell adjacent to said group;
    coupling an AND gate between a carry-skip cell and a respective group of carry-processing cells across which said carry-skip cell is connected, to receive carry signals from all carry-processing cells in said respective group to produce an output which controls said carry-skip cell;
    determining a maximum number of carry-processing cells that can be bypassed by said carry-skip cells, wherein said maximum number has a relationship with a total number of said plurality of carry-processing cells; and
    limiting a number of carry-processing cells that can be bypassed by said carry-skip cells to be equal to or less than said maximum number, wherein operation of each carry-processing cell includes:
        using first and second wires in each carry-processing cell to represent a carry signal by a difference between potentials on said first and second wires;
        coupling a pair of switch transistors respectively to said first and second wires to turn on or off said first and second wires in response to a propagate signal;
        coupling a first pull-down transistor of a first conductivity type to said first wire to reduce a potential of said first wire in response to a kill signal;
        coupling a second pull-down transistor of said first conductivity type to said second wire to reduce a potential of said second wire in response to a generate signal;
        coupling a first pull-up transistor of a second conductivity type opposite to said first conductivity type, to said first wire to increase a potential of said first wire in response to a signal complementary to said generate signal; and
        coupling a second pull-up transistor of said second conductivity type to said second wire to raise a potential of said second wire in response to a signal complementary to said kill signal.

10. A method as in claim 9, further comprising:

determining delays at bit positions; and reducing differences between said delays by changing channel widths of transistors in each carry-processing cell, each carry-skip cell, and each AND gate decrease as the bit position changes from the least significant bit position to the most significant bit position.

11. A method as in claim 9, further comprising coupling each of said first and second pull-down transistors to bring a respective potential of either of said first and second wires at or near ground.

12. A 32-bit binary adder, comprising:

thirty-two carry-processing cells connected in series, each processing carry information to generate a carry signal indicating a kill, a generate, or a propagate for a respective bit position; and sixteen carry-skip cells to eliminate passing a carry bit through selected groups of carry-processing cells, each carry-skip cell coupled across a respective group of carry-processing cells to send a carry bit directly to a carry-skip cell that is subsequent to a most significant bit position in said respective group, when each and every carry-processing cell in said respective group produces a propagate, wherein each carry-skip cell is connected to bypass no more than six sequential carry-processing cells, wherein said fifteen carry-skip cells are coupled to transmit a generate from any bit position to an output of the most significant bit position by passing through no more than a total of eight carry-skip cells and carry-processing cells, and wherein said carry-processing cells and carry-skip cells are CMOS circuits to have two low voltage swing wires to represent a carry bit signal, said carry-processing cell including:

first and second wires whose difference in potential represents a carry bit signal;

a pair of switch transistors respectively coupled to said first and second wires to turn on or off said first and second wires in response to a propagate signal;

a first pull-down transistor of a first conductivity type coupled to said first wire to reduce a potential of said first wire in response to a kill signal;

a second pull-down transistor of said first conductivity type coupled to said second wire to reduce a potential of said second wire in response to a generate signal;

a first pull-up transistor of a second conductivity type opposite to said first conductivity type, coupled to said first wire to increase a potential of said first wire in response to a signal complementary to said generate signal; and a second pull-up transistor of said second conductivity type coupled to said second wire to raise a potential of said second wire in response to a signal complementary to said kill signal.

13. An adder as in claim 12, wherein said first and second pull-up transistors are pmos transistors, said first and second pull-down transistors and said pair of switch transistors are nmos transistors.

14. An adder as in claim 12, wherein each of said first and second pull-down transistors is coupled to bring a respective potential of either of said first and second wires at or near ground.

15. An adder as in claim 12, wherein said sixteen carry-skip cells include:

a carry-skip cell coupled across carry-processing cells at the second and third bit positions;

a carry-skip cell coupled across carry-processing cells at the fifth and sixth bit positions;

a carry-skip cell coupled across carry-processing cells from the seventh through the ninth bit positions;

a carry-skip cell coupled across carry-processing cells from the fourth through the ninth bit positions;

a carry-skip cell coupled across carry-processing cells from the tenth through the fifteenth bit positions;

a carry-skip cell coupled across carry-processing cells at the eleventh and twelfth bit positions;

a carry-skip cell coupled across carry-processing cells from the thirteenth through the fifteenth bit positions;

a carry-skip cell coupled across carry-processing cells from the sixteenth through the twenty-first bit positions;

a carry-skip cell coupled across carry-processing cells at the seventeenth and eighteenth bit positions;

a carry-skip cell coupled across carry-processing cells at the nineteenth and twentieth bit positions;

a carry-skip cell coupled across carry-processing cells from the twenty-second through the twenty-fourth bit positions;

a carry-skip cell coupled across carry-processing cells at the twenty-fifth and twenty-sixth bit positions;

a carry-skip cell coupled across carry-processing cells from the twenty-second through the twenty-seventh bit positions;

a carry-skip cell coupled across carry-processing cells at the twenty-eighth and twenty-ninth bit positions;

a carry-skip cell coupled across carry-processing cells from the twenty-eighth through thirtieth bit positions; and a carry-skip cell coupled across carry-processing cells from the twenty-eighth through thirty-first bit positions.

* * * * *